UNITED STATES PATENT OFFICE.

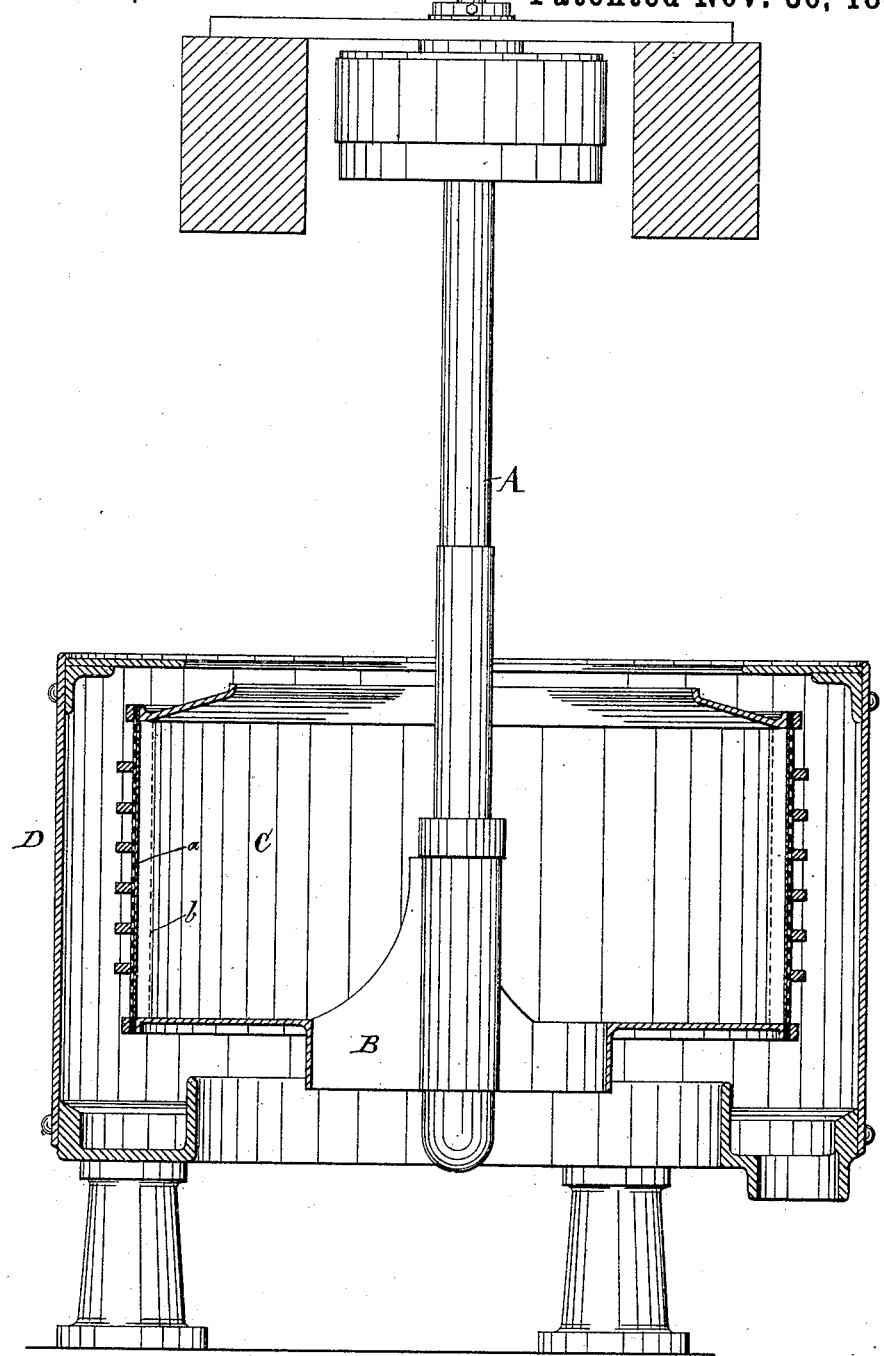

CHARLES H. W. FOSTER, OF BROOKLINE, ASSIGNOR OF ONE-FOURTH TO DAVID M. WESTON, OF BOSTON, MASSACHUSETTS.

METHOD OF FILTERING SUGAR-LIQUORS, SIRUPS, AND SACCHARINE JUICES.

SPECIFICATION forming part of Letters Patent No. 353,404, dated November 30, 1886.

Application filed April 12, 1886. Serial No. 198,540. (No specimens.)

*To all whom it may concern:*

Be it known that I, CHARLES H. W. FOSTER, of Brookline, county of Norfolk, and State of Massachusetts, have invented an Improvement in Methods of Filtering Sugar-Liquors, Sirups, and Saccharine Juices, of which the following description, in connection with the accompanying drawing, is a specification, like letters on the drawing reprepresenting like parts.

In the operation of separating and removing from sugar-liquors, sirups, and saccharine juices the slimy or gummy mass contained therein as impurities, it has been customary to pass the "liquor," as I shall hereinafter denominate the material which is to be filtered and refined, from the melting-pan into long bags, called "filter-bags," the liquor passing through an inner into and then through an outer bag. The filtering of liquors by bags, as stated, is very slow, for the slimy and gummy matters in the liquor soon stop up the interstices of the fabric and the bags have frequently to be separated and cleansed. Likewise, sugar-liquors have been treated by what is called a "filter-press," the press having hollow perforated platens partially surrounded by cloth, the liquor to be filtered being forced through the cloth by hydrostatic pressure, and from the cloth through the platens.

In some cases the liquors or juices to be treated in the filter-press have had mixed with them a certain quantity of coal-dust, to constitute an absorbent for the slimy or gummy matters in the liquors. In these processes the cloths surrounding the platens are quickly clogged or stopped, so that the liquors and juices which it is desired to save fail to pass through the cloth, and the cloth has to be removed and cleansed, which calls for a partial dismemberment of the press and entails considerable expense.

In my experiments to improve and also expedite the process of filtering liquors such as described, I have discovered that the liquor, thinned and melted, as usual, may be quickly and effectually filtered and clarified by a method or process, substantially as follows—*i. e.*, the liquor to be filtered has mixed with it a light granular material preferably coal-dust, lignite, clear sand, or other granular material capable of acting as a filtering medium. The filtering material so added will be about one-fifth in weight of that of the solid matter contained in the liquid. The mixture is then placed in a centrifugal machine of usual construction, modified, however, by the addition within it, next to the inner side of the wall of the usual perforated basket, of a lining of textile material, the said lining preventing the clogging of the usual holes in the basket. The centrifugal machine containing the liquor with the filtering material mixed with it is then made to revolve rapidly, to effect the separation of the liquor which it is desired to save from the mass of material contained within the basket of the machine. The slimy or gummy mass contained in the liquors remains in the granular matter mixed with the liquor, and the said granular matter accumulates in a wall at the inner side of the basket, and it may so accumulate until the wall is too thick to permit the ready passage through it of the liquor which it is desired to save, and thereafter the machine is stopped and the wall or filtering material is removed, as the sugar-wall is commonly removed from the basket.

The drawing shows a sufficient portion of a centrifugal machine, the latter being in vertical section, to enable my invention to be understood.

Referring to the drawing, the rotating hollow spindle A, suspended from above in any usual manner, and having at its lower end a spider or open hub, B, and the centrifugal basket C, composed of reticulated metal having curbs at top and bottom, and the jacket D, surrounding the centrifugal basket, are and may be of usual construction, the apparatus so far described being substantially such as in common use.

Inside of the basket, and next to its inner wall, I have applied a layer, *a*, of textile material, the same being shown in section, and, as herein shown, the textile material is held in place between the upper and lower curves and the inner side of the wall of the basket; but the textile material may be applied in any other suitable manner.

The dotted line *b* represents the position that the granular material will assume when the basket is in rapid rotation, the wall of the granular material standing substantially of uniform thickness from the top to the bottom of the basket.

I claim—

The herein-described method of filtering sugar-liquors, sirups, and saccharine juices, which consists in mixing with the said liquors and juices a granulated filtering medium, substantially as described, placing the said juices and granular filtering material in a basket of a centrifugal machine, and subjecting the same to centrifugal action to remove the thinner juices which are to be saved, the slimy or gummy mass or impurities contained in the said liquors or juices remaining in the granular filtering material, substantially as described.

In testimony whereof I have signed my name to this specification in the presence of two subscribing witnesses.

CHARLES H. W. FOSTER.

Witnesses:
F. CUTTER,
C. M. CONE.